Figure 1:
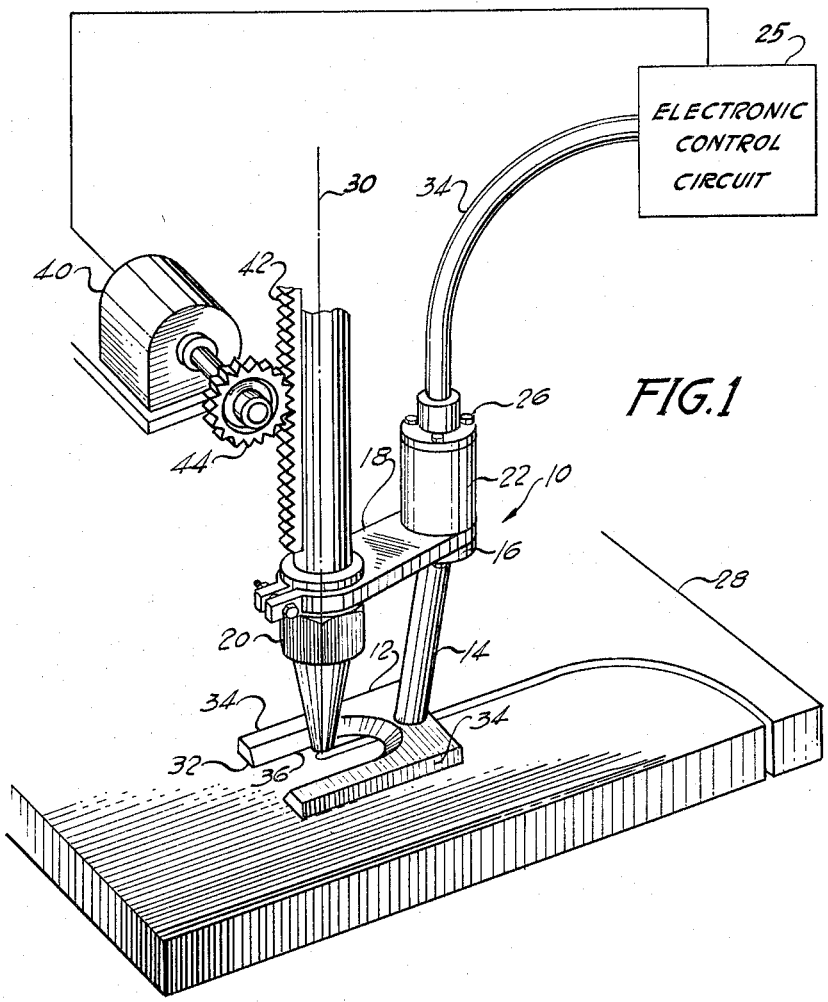

HEIGHT CONTROL TRANSDUCER

Filed Sept. 13, 1961

INVENTOR

FRANS BROUWER

BY *William G. Newman*

ATTORNEY

United States Patent Office 3,290,032
Patented Dec. 6, 1966

3,290,032
HEIGHT CONTROL TRANSDUCER
Frans Brouwer, Glencoe, Ill., assignor to Stewart-Warner Corporation, Chicago, Ill., a corporation of Virginia
Filed Sept. 13, 1961, Ser. No. 137,770
6 Claims. (Cl. 266—23)

This invention relates to height control apparatus and more particularly to a transducer for an electronic height control to be used with gas torch welding or cutting apparatus.

Increased demands for automated processes in all manufacturing industries have created a need for improved control devices, especially for use with gas torch welding and cutting machines. These techniques generally involve a movement of a gas torch along a described path over the surface of stock material either to cut the material to a certain pattern or to weld a seam of a particular shape. Automatic pattern followers have been developed to guide these types of tools in accordance with contour designs in the form of drawings or templets with little need for manual manipulation. However, for full automation with accuracy within tolerable limits it is desirable that the spacial relationship between the work stock and the gas torch be controlled. The size of the cut or the weld produced by a gas torch is directly related to the distance between the torch and the work piece. There have thus been developed servo-mechanical devices, which, by means of electrical sensing circuits, control the distance between a transducer element affixed to the gas torch and the stock material. An example of one type of height control system may be found in my copending application, Serial No. 117,106, filed June 14, 1961, now Patent No. 3,175,145, wherein variations in capacitance between the transducer and stock material are utilized to produce an electric signal capable of driving a motor for raising or lowering the torch with respect to the work piece.

As described in that application it is desirable that a portion of the electronic circuitry be located as close to the transducer as possible to eliminate the affects of stray capacity along the length of a connecting cable between the transducer and the circuitry. Unfortunately this electronic circuitry is sensitive to environmental conditions and especially to the temperature level of its component parts. The transducer element being an electrical conductor must also be a heat conductor which readily transmits heat energy from the space adjacent the flame of the gas torch to the electronic circuitry. It is, therefore, a primary object of this invention to provide a transducer element for height control apparatus associated with gas torch cutting or welding devices in which the heat absorbed and transmitted by the transducer from the flame of the gas torch is materially reduced.

Figure 2:
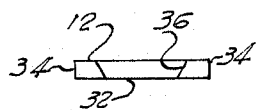

Other objects and advantages of this invention will become readily apparent upon a further reading of this specification, especially when taken in view of the accompanying drawings, in which:

FIG. 1 is an isometric view of a transducer assembly attached to a gas torch; and FIG. 2 is an end view of the transducer plate.

A preferred embodiment of a transducer assembly 10 as shown in the drawing comprises a transducer plate 12 and a support post 14 welded thereto. The support post 14 has a platform 16 welded to its opposite end to which is attached a mounting bracket 18 for securing the assembly 10 to a gas torch 20. A housing 22 is also supported on the mounting bracket 18 within which may be disposed an auto transformer coil having coaxial connections 24 to an oscillator in the electronic control circuitry 25, such as that described in my aforementioned copending application. The support platform 16, mounting bracket 18 and housing 22 are maintained in assembly by means of bolt and nut assemblies 26 extending through aligned apertures therein. The auto transformer coil may have an appropriate connection to the support platform 16 through an aperture (not shown) in the mounting bracket so that the transducer plate 12 is electrically connected to the coil through the support post 14 and the platform 16.

The assembly 10 is arranged in a manner such that the transducer plate 12 is positioned generally parallel to the work piece 28 in which the pattern is being cut, when the axis 30 of the welding torch is perpendicular to the surface of the work piece.

The transducer plate 12 is a U-shaped member having a flat surface 32 confronting the surface of the work piece 20. The legs 34 of the U-shaped transducer plate 12 extend forward in the direction of relative motion between the gas torch 20 and the work piece 28, and they are spaced approximately equidistant from the point of intersection between the axis 30 of the gas torch and the surface of the work piece 28.

As described in the copending application the transducer plate 12 forms a part of an electronic oscillator in a control circuit (not shown). The capacity between the plate 12 and the work piece 28 is reflected back through the auto transformer to a tank circuit in the oscillator which will cause the oscillator to change frequency in accordance with changes in the reflected capacity. The frequency deviations of the oscillator are transposed into appropriate electric signals by means of electronic circuitry so that they may be used to drive a reversible motor 40. The motor 40, by means of rack 42 and pinion 44, serves to drive the gas torch 20 and the transducer assembly 10 rigidly attached thereto in response to changes in the capacity between the transducer plate 12 and the work piece 28.

For optimum control and sensitivity of the system it is desirable that the transducer plate 12 be located as close to the tip of the gas torch 20 as possible and that it presents a sufficient area confronting the work piece 28 in the near vicinity of the tip of the gas torch. However, if the transducer plate is positioned too near the flame of the gas torch it will absorb heat radiated from the flame which will then be transmitted to the auto transformer coil to have a marked affect on the reflected capacity transmitted to the oscillator. The inner facing surfaces 36 (FIG. 2) of the legs 34 on the U-shaped transducer plate 12 are, therefore, beveled such that they diverge from one another in a direction away from the surface of the work piece 28. By inclining the surfaces 36 the amount of heat absorbed by the transducer 10 is materially reduced while maintaining a substantial confronting area with the work piece 28. The sensitivity of the height control device is thereby maintained and the effects of the heat radiated from the gas torch flame are materially reduced.

It is the intention of the inventor to be bound, not by the details of the particular embodiment hereinbefore disclosed, but only by the scope of the attached claims.

What is claimed is:

1. A height control transducer for use with a gas torch having a flame tip positioned adjacent a work piece, comprising a flat plate member having a beveled opening therein, means for rigidly securing said member to the torch adjacent the flame tip and perpendicular to the axis of said torch, said plate being positioned so that the axis of said torch passes through said opening, the bevel around said opening diverging from the axis of the torch in a direction away from the work piece.

2. A transducer for a height control for use with a movable gas torch having a flame tip positioned adjacent a work piece, said transducer comprising a U-shaped member having a flat surface, said member having projecting leg portions with mutually facing surfaces extending from a base portion, the mutually facing surfaces being beveled divergently in a direction away from said flat surface, a post having one end secured to said member on the side opposite said flat surface, a platform at the opposite end of said post, means attached to said platform for securing the assembly comprising said member, said post and said platform to said torch, said member being positioned having its flat surface parallel to and adjacent the work piece and the beveled surfaces of said legs flanking the flame tip of the gas torch.

3. In combination with electronic circuitry for controlling the height of a gas torch having a flame tip above a work piece, a transducer comprising a flat plate having a beveled opening therein through which the axis of said torch extends to intersect said work piece, means rigidly mounting said plate on said torch with the opening therein adjacent said flame tip, means mounting a portion of said electronic circuitry in proximity with said torch and electrically connecting same to said plate, said bevel diverging from said axis in a direction away from said work piece.

4. In combination with electronic circuitry for controlling the height of a gas torch having a flame tip about a work piece, a transducer comprising a flat plate having a U-shaped opening therein, means rigidly mounting said plate on said torch with the opening therein adjacent said flame tip and the axis of said torch passing centrally therethrough to intersect said work piece, means mounting a portion of said electronic circuitry in proximity with said torch and electrically connecting same to said plate, said opening being beveled to diverge from said axis in a direction away from said work piece.

5. A transducer for use with a height control system operative to maintain a gas torch rigidly supporting said transducer at a constant predetermined distance from a work piece responsive to changes in capacitance between said transducer and said work piece, said transducer characterized by its construction wherein it comprises a flat plate having an opening therein through which the axis of said torch extends to intersect said work piece, said opening being beveled to diverge from said axis in a direction away from the work piece.

6. A transducer for use with a height control system operative to maintain a gas torch rigidly supporting said transducer at a constant predetermined distance from a work piece responsive to changes in capacitance between said transducer and said work piece, said transducer characterized by its construction wherein it comprises a U-shaped flat plate having a U-shaped opening, means for mounting said plate so that the axis of said torch extends centrally through said opening to intersect said work piece, said opening being beveled to diverge from said axis in a direction away from the work piece.

References Cited by the Examiner

UNITED STATES PATENTS

| 2,747,152 | 5/1956 | Greene | 266—23 |
| 2,766,982 | 10/1956 | Bechtle et al. | 266—23 |

FOREIGN PATENTS

| 546,098 | 6/1947 | Great Britain. |

JOHN F. CAMPBELL, *Primary Examiner.*

RAY K. WINDHAM, F. R. LAWSON,
*Assistant Examiners.*